(12) United States Patent
Kanemaru et al.

(10) Patent No.: US 11,928,040 B2
(45) Date of Patent: Mar. 12, 2024

(54) API ADAPTER TEST SYSTEM, API ADAPTER TEST ASSISTANCE DEVICE, API ADAPTER TEST ASSISTANCE METHOD, AND API ADAPTER TEST ASSISTANCE PROGRAM

(71) Applicant: Nippon Telegraph and Telephone Corporation, Tokyo (JP)

(72) Inventors: Sho Kanemaru, Musashino (JP); Tomoki Ikegaya, Musashino (JP); Kensuke Takahashi, Musashino (JP); Tsuyoshi Toyoshima, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/798,733

(22) PCT Filed: Feb. 14, 2020

(86) PCT No.: PCT/JP2020/005755
§ 371 (c)(1),
(2) Date: Aug. 10, 2022

(87) PCT Pub. No.: WO2021/161500
PCT Pub. Date: Aug. 19, 2021

(65) Prior Publication Data
US 2023/0081779 A1    Mar. 16, 2023

(51) Int. Cl.
*G06F 11/273* (2006.01)
*G06F 9/54* (2006.01)

(52) U.S. Cl.
CPC ............ *G06F 11/273* (2013.01); *G06F 9/541* (2013.01)

(58) Field of Classification Search
CPC ......... G06F 11/273; G06F 9/541; G06F 11/36
See application file for complete search history.

(56) References Cited

U.S. PATENT DOCUMENTS

2020/0410386 A1* 12/2020 Loving ................. G06F 16/211
2021/0334149 A1* 10/2021 Take ......................... G06F 8/36

OTHER PUBLICATIONS

Kanemaru et al., "A study on automation of testing API adapters," Electronic Information and Communication Society Conference, Mar. 19, 2019, 2 pages.

* cited by examiner

*Primary Examiner* — Matthew M Kim
*Assistant Examiner* — Kyle Emanuele
(74) *Attorney, Agent, or Firm* — Fish & Richardson P.C.

(57) ABSTRACT

An API adapter test support system includes an API adapter test support apparatus, a user terminal simulation apparatus and a user server simulation apparatus. The user terminal simulation apparatus and the user server simulation apparatus are connected to a wholesale service apparatus to which an API adapter. The API adapter test support apparatus includes a test scenario creation unit configured to create a test scenario that ensures comprehensiveness of a test case of an API adapter test, a control signal test scenario execution unit configured to execute a control signal API test for the API adapter by using the test scenario, and a data signal test scenario execution unit configured to execute a data signal API test for the user terminal simulation apparatus and the user server simulation apparatus by using the test scenario.

7 Claims, 9 Drawing Sheets

(a) EXAMPLE OF PATTERN OF TEST PARAMETER

| operatorId | month | result |
|---|---|---|
| opA | 2019-11 | 200 OK |
| opB | 2019-12 | 400 Bad |

(b) EXAMPLE OF TEST CASE CREATED BY PAIRWISE METHOD

| PATTERN | operatorId | month | result |
|---|---|---|---|
| 1 | opA | 2019-12 | 200 |
| 2 | opA | 2019-11 | 400 |
| 3 | opB | 2019-12 | 200 |
| 4 | opB | 2019-11 | 400 |

```
newman 1-0_sim_simgroup

Folder 0_prepare / SIM DETACH
Sub-folder SIM DETACH
  DELETE http://10.68.10.25/v2/ue/812045678901 [404 NOT FOUND, 390B, 101 ms]
  Pass    response code is 404

Folder 0_prepare / vAPN DELETION
Sub-folder vAPNDELETION_EPC
  DELETE http://10.68.10.25/v2/apn [200 OK, 150B, 32 ms]
  Pass    response is 200

Folder 0_prepare / SETUP RADIUS CONFIGURATION TO DEMOEPIC
Sub-folder cleanup demoepc
  POST 10.68.10.25/v2/config [200 OK, 494B, 21 ms]       ⎱ q2
  {  Pass
     "sgic_ip_address":"10.68.10.25",
     "radius_ip_address":["10.68.32.5",
                          "10.68.34.5"]
  }
  Pass   Status code is 200

Folder 1_SIM REGISTRATION / 1_SIM
Sub-folder SIM REGISTRATION
  POST http://10.68.32.5/orderManagement/v1/productOrder ▮
``` q1 ⟶ (points to POST line)
q3 ⟶ (points to JSON body)

API ADAPTER TEST SYSTEM, API ADAPTER TEST ASSISTANCE DEVICE, API ADAPTER TEST ASSISTANCE METHOD, AND API ADAPTER TEST ASSISTANCE PROGRAM

CROSS-REFERENCE TO RELATED APPLICATIONS

This application is a National Stage application under 35 U.S.C. § 371 of International Application No. PCT/JP2020/005755, having an International Filing Date of Feb. 14, 2020. The disclosure of the prior application is considered part of the disclosure of this application, and is incorporated by reference in its entirety into this application.

TECHNICAL FIELD

The present invention relates to an API adapter test support system, an API adapter test support apparatus, an API adapter test support method, and an API adapter test support program.

BACKGROUND ART

In recent years, the importance of multi-service coordination execution devices for building and operating services by combining multiple wholesale partner services has been increasing. As new wholesale services are introduced and existing service specifications are frequently changed, service providers are required to keep up with new wholesale services and changes in existing service specifications at low cost and in a short period of time.

In order to cope with such changes, API adapters have been automatically created to absorb the differences in API specifications for each of the various services used, and the communication of control signals between API adapters and wholesale services has also been automated (see NPTL 1).

CITATION LIST

Non Patent Literature

NPTL 1 Sho Kanemaru, and 3 others, "A study on automation of testing API adapters", IEICE society conference, BS-4-12, IEICE, Mar. 19 to 22, 2019

SUMMARY OF THE INVENTION

Technical Problem

However, although the technology disclosed in NPTL 1 can confirm the communication of control signals in the API adapter, it cannot confirm the content of the control signals or whether the data signals that affect the user are correct or not. In order to check the contents of the control signals, it is necessary to implement procedures such as logging in to the device and communication check commands of data signals, which takes time to check.

As described above, in order to check the contents of control signals and data signals that affect the user, the person in charge of development (the user) needs to conduct tests manually, which is labor-intensive and time-consuming, and there has been a growing demand for time-saving confirmation regarding whether the API adapter created is operating properly.

Under the above-mentioned circumstances, an object of the present invention is to provide an API adapter test support system, an API adapter test support apparatus, an API adapter test support method, and an API adapter test support program that can readily determine the normality of the API adapter in short time.

Means for Solving the Problem

According to an aspect of the present invention, an API adapter test support system for supporting a test for determining normality of an API adapter includes: an API adapter test support apparatus; a user terminal simulation apparatus; and a user server simulation apparatus, the user terminal simulation apparatus and the user server simulation apparatus being connected to a wholesale service apparatus that uses the API adapter. The API adapter test support apparatus includes: a test scenario creation unit configured to create a test scenario that ensures comprehensiveness of a test case of an API adapter test by using at least one selected from the group consisting of an NB-API specification data, wholesale service API specification data, a test parameter, and wholesale service data transmitted from a user terminal; a control signal test scenario execution unit configured to execute a control signal API test for the API adapter by using the test scenario; and a data signal test scenario execution unit configured to execute a data signal API test for the user terminal simulation apparatus and the user server simulation apparatus by using the test scenario.

According to an aspect of the present invention, an API adapter test support apparatus for supporting a test for determining normality of an API adapter includes: a test scenario creation unit configured to create a test scenario that ensures comprehensiveness of a test case of an API adapter test by using at least one selected from the group consisting of an NB-API specification data, wholesale service API specification data, a test parameter, and wholesale service data transmitted from a user terminal; a control signal test scenario execution unit configured to execute a control signal API test for the API adapter by using the test scenario; and a data signal test scenario execution unit configured to execute a data signal API test for at least one selected from the group consisting of a user terminal simulation apparatus and a user server simulation apparatus connected to a wholesale service apparatus that uses the API adapter, by using the test scenario According to an aspect of the present invention, an API adapter test support method of supporting a test for determining normality of an API adapter includes: creating a test scenario that ensures comprehensiveness of a test case of an API adapter test by using at least one selected from the group consisting of an NB-API specification data, wholesale service API specification data, a test parameter, and wholesale service data transmitted from a user terminal; executing a control signal API test for the API adapter by using the test scenario; and executing a data signal API test for at least one selected from the group consisting of a user terminal simulation apparatus and a user server simulation apparatus connected to a wholesale service apparatus that uses the API adapter, by using the test scenario.

An API adapter test support program according to an aspect of the present invention is configured to cause a computer to function as the API adapter test support apparatus.

Effects of the Invention

According to the present invention, the normality of the API adapter can be readily determined in short time.

DESCRIPTION OF EMBODIMENTS

An API adapter test support system according to an embodiment of the present invention is described below.

Configuration of API Adapter Test Support System

Figure 1:
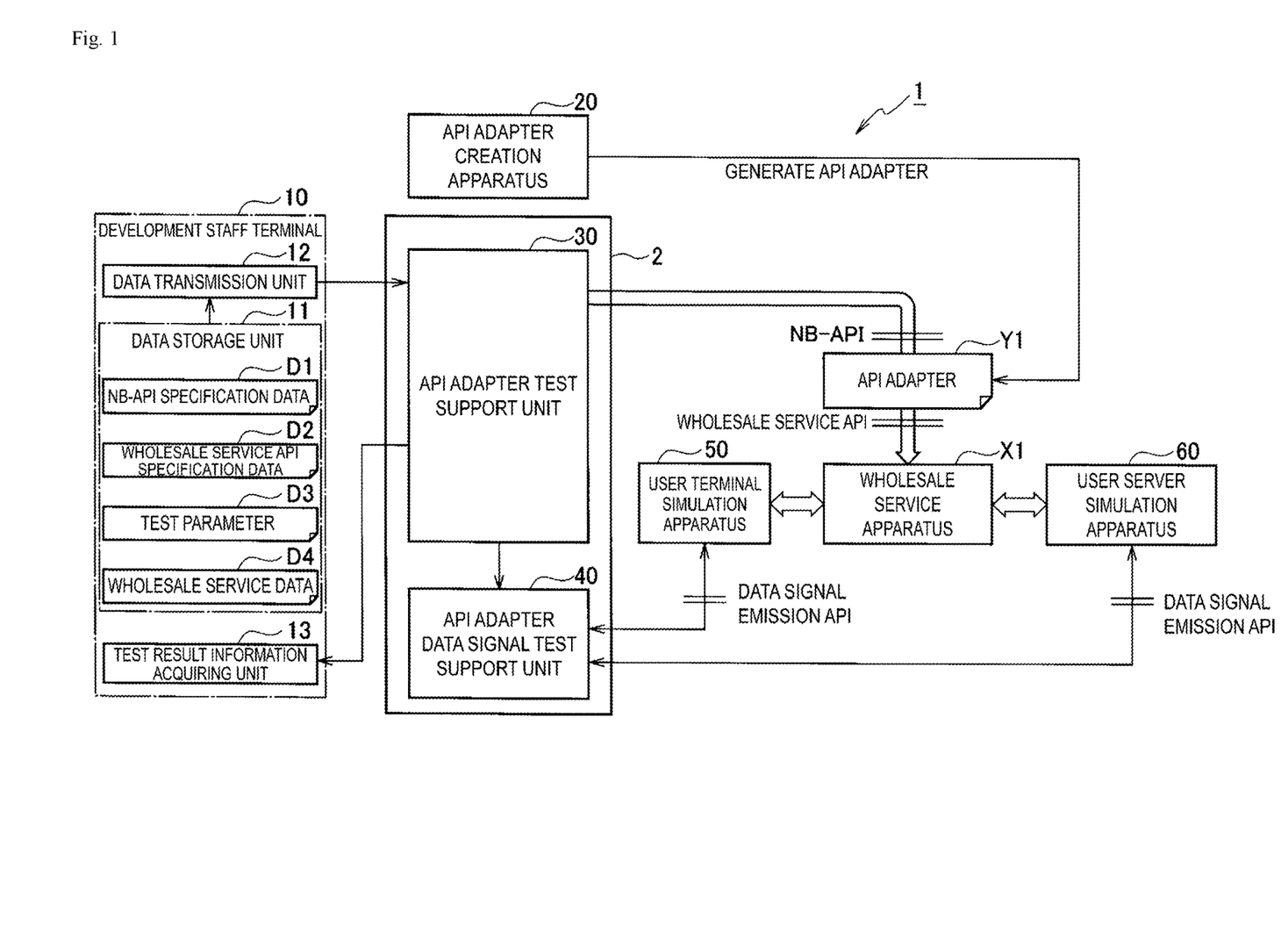
FIG. 1 is a block diagram illustrating a configuration of an API adapter test support system according to an embodiment of the present invention.
Figure 2:
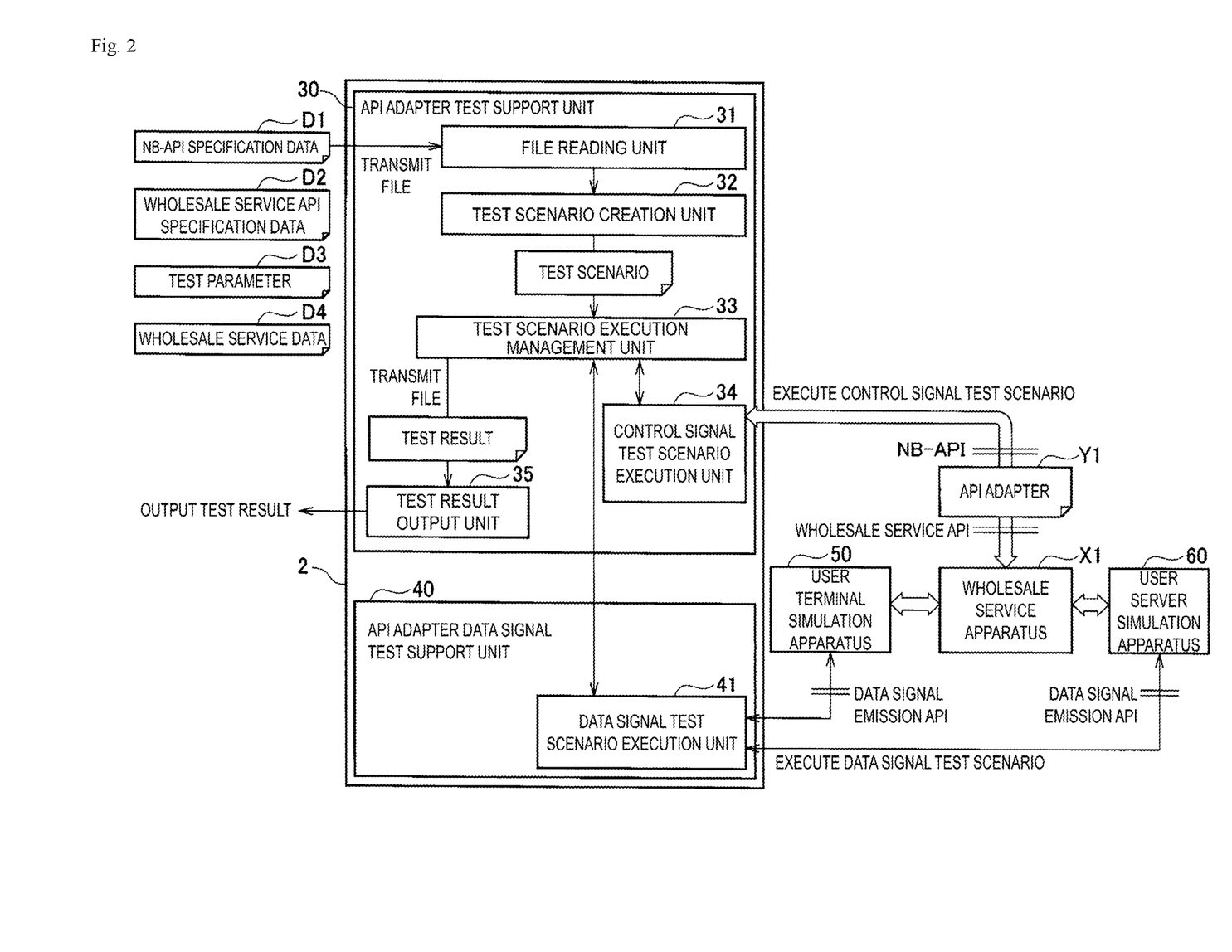
FIG. 2 is a block diagram illustrating a specific configuration of an API adapter test support apparatus mounted in the API adapter test support system according to the embodiment of the present invention.

FIG. 1 is a block diagram illustrating a configuration of the API adapter test support system according to the embodiment of the present invention, and FIG. 2 is a block diagram illustrating a specific configuration of an API adapter test support apparatus 2 illustrated in FIG. 1.

As illustrated in FIG. 1, an API adapter test support system 1 supports a confirmation test of the normality of the API adapter created by an API adapter creation apparatus 20, and includes the API adapter test support apparatus 2 connected to a development staff terminal 10 (user terminal), a user terminal simulation apparatus 50, and a user server simulation apparatus 60. The API adapter test support apparatus 2 includes an API adapter test support unit 30, and an API adapter data signal test support unit 40.

The API adapter creation apparatus 20 automatically creates an API adapter Y10 for use in a wholesale service apparatus X1. The API adapter creation apparatus 20 automatically creates the API adapter Y1 by adopting the method disclosed in JP-2019-144848A, for example.

The wholesale service apparatus X1 is, for example, an authentication server that performs authentication of SIMs used in mobile phones and is an apparatus with a public API. Other examples of the wholesale service apparatus X1 may include cloud service and private network service.

The development staff terminal 10 (user terminal) is a terminal configured to be operated by a development staff (user) who conducts the normality determination test of the API adapter Y1 subjected to normality confirmation, and includes a data storage unit 11, a data transmission unit 12, and a test result information acquiring unit 13.

The data storage unit 11 stores Northbound API (NB-API) specification data D1, wholesale service API specification data D2, a test parameter D3, and wholesale service data D4.

The NB-API specification data D1 is, for example, API specification data composed of a swagger spec file for defining the NB-API specification of the wholesale service apparatus X1 before conversion by the API adapter Y1 subjected to the test. Specifically, as indicated by the reference symbol d1 in FIG. 4, it defines the content of a response code and an input parameter.

The wholesale service API specification data D2 is, for example, API specification data for defining the wholesale service API specification in which the API signal is converted by the API adapter Y1. Specifically, as indicated by the reference symbols d21 and d22 in FIG. 4, it defines the content of a response code and an input parameter. FIG. 10 illustrates an example of data of wholesale service API specification.

Figure 4:
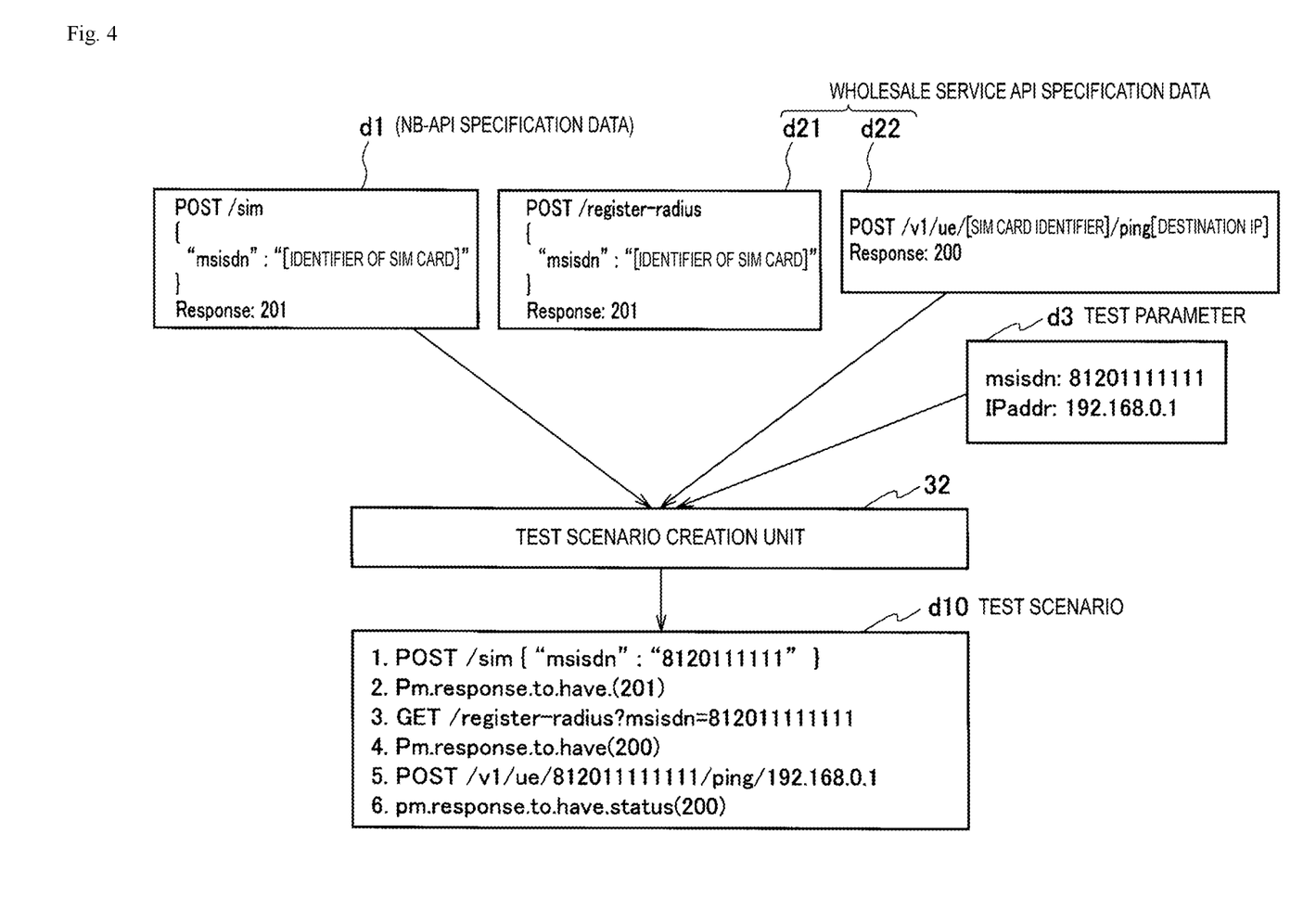
FIG. 4 is an explanatory diagram illustrating a test scenario that is created using NB-API specification data, wholesale service API specification data, and a test parameter.

The test parameter D3 is, for example, information representing a test parameter for use in the normality determination test process, which is included in an NB-API signal to be input to the API adapter Y1, as indicated by the reference symbol d3 in FIG. 4. FIG. 11 illustrates an example of data representing the test parameter D3.

The wholesale service data D4 is data for creating response data for a second API request after conversion of a first API request, which is an input signal to the API adapter Y1, by the API adapter Y1. FIG. 12 illustrates an example of wholesale service data D4.

On the basis of an operation made by the development staff, the data transmission unit 12 illustrated in FIG. 1 transmits file information holding each data (the above-described D1 to D4) stored in the data storage unit 11, to the API adapter test support apparatus 2.

The test result information acquiring unit 13 includes a display unit (omitted in the drawing), acquires test result information sent from the API adapter test support apparatus 2, and displays it on the display unit, for example. The development staff can recognize the test result information by looking at the displayed screen. In addition, the development staff terminal 10 includes an input unit (omitted in the drawing) from which the development staff inputs various information. Note that it is also possible to adopt a configuration in which a touch panel serving as both the above-described display unit and input unit.

As illustrated in FIG. 2, the API adapter test support unit 30 includes a file reading unit 31, a test scenario creation unit 32, a test scenario execution management unit 33, a control signal test scenario execution unit 34, and a test result output unit 35. In addition, the API adapter data signal test support unit 40 includes a data signal test scenario execution unit 41.

The file reading unit 31 reads the file information (the above-described D1 to D4) transmitted from the development staff terminal 10. The read file information is transmitted to the test scenario creation unit 32.

The test scenario creation unit 32 creates a test scenario on the basis of at least one of the data (selected from the group consisting D1, D2, D3 and D4) included in the file information read by the file reading unit 31. As an example, the test scenario creation unit 32 creates the test scenario that ensures the comprehensiveness of the pattern of the test parameter D3 by using a pairwise method. The test scenario creation unit 32 creates a test scenario by using a combination test case creation tool such as "PictMaster", for example.

Figure 3:
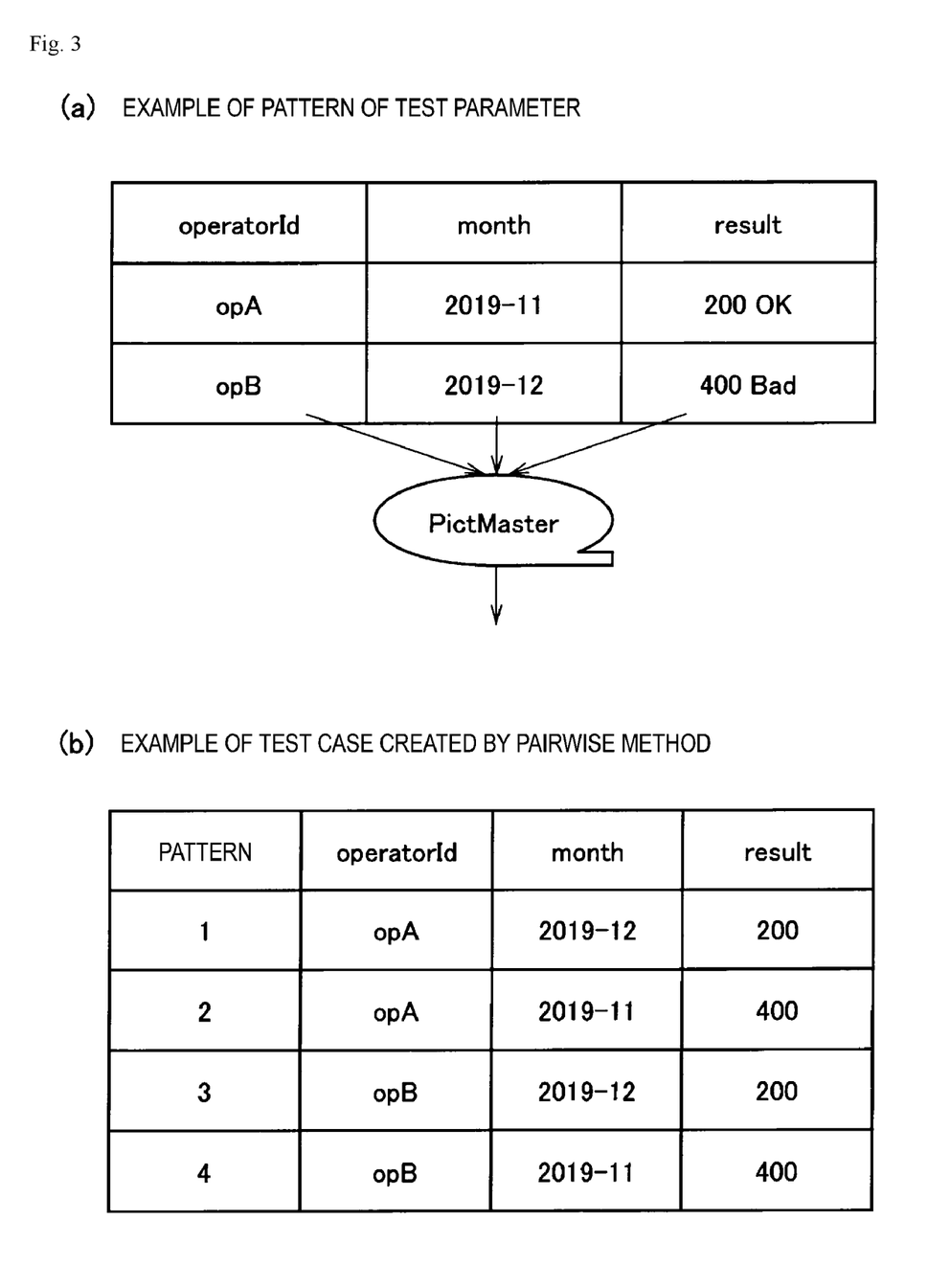
FIG. 3 is an explanatory diagram illustrating an example in which the test case amount is reduced by employing a pairwise method.

FIG. 3(a) illustrates an example of a pattern of a test parameter, and FIG. 3(b) illustrates an example of a test case created by a pairwise method. As illustrated in FIG. 3, all combinations of a pair (operatorId and month), and a pair (operatorId and result) are covered.

More specifically, in the example of the pattern illustrated in FIG. 3(a), each of the items "operatorId", "month" and "result" has two data, and accordingly all combinations are (2×2×2=8), i.e., combinations of eight patterns. By setting the combinations of the four patterns illustrated in FIG. 3(b) for the combinations of eight patterns, all combinations are covered while reducing the total number of combinations.

FIG. 4 is an explanatory diagram illustrating a test scenario created by the test scenario creation unit 32. In the example illustrated in FIG. 4, a test scenario d10 is created using the NB-API specification data D1 (d1), the wholesale service API specification data D2 (d21 and d22), and the test parameter D3 (d3).

In the created test scenario d10, "1. POST/sim {"msisdn": "8120111111"}" indicates NB-API execution. "2. Pm.response.to.have.(201)" indicates that it is OK if "201" is returned. "3. GET/register-radius?msisdn=812011111111" indicates execution of the wholesale service API. "4. Pm.response.to.have (200)" indicates that it is OK if "200" is returned. "5. POST/v1/ue/812011111111/ping/192.168.0.1" indicates execution of the data signal API.

Returning back to FIG. 2, the test scenario execution management unit 33 controls the control signal test scenario execution unit 34 to execute the API of the control signal. In addition, the test scenario execution management unit 33 controls the data signal test scenario execution unit 41 to execute the API of the data signal. Further, the test scenario execution management unit 33 acquires a test result of the control signal created by the control signal test scenario execution unit 34 and a test result of the data signal created by the data signal test scenario execution unit 41, and creates test result information on the basis of the acquired results. The test scenario execution management unit 33 transmits the created test result information to the test result output unit 35.

On the basis of the test scenario created by the test scenario creation unit 32, the control signal test scenario execution unit 34 causes the wholesale service apparatus X1 to execute the API of the control signal, and receives its response result. The control signal test scenario execution unit 34 may use "newman", which is an API test tool. The control signal test scenario execution unit 34 executes the API in the order designated by the "newman" script, and confirms the content of the API response. On the basis of the API response, the control signal test scenario execution unit 34 creates test result information of the normality determination test by determining the normality depending on whether it is an expected response for the control signal for each query pattern.

Figure 5:
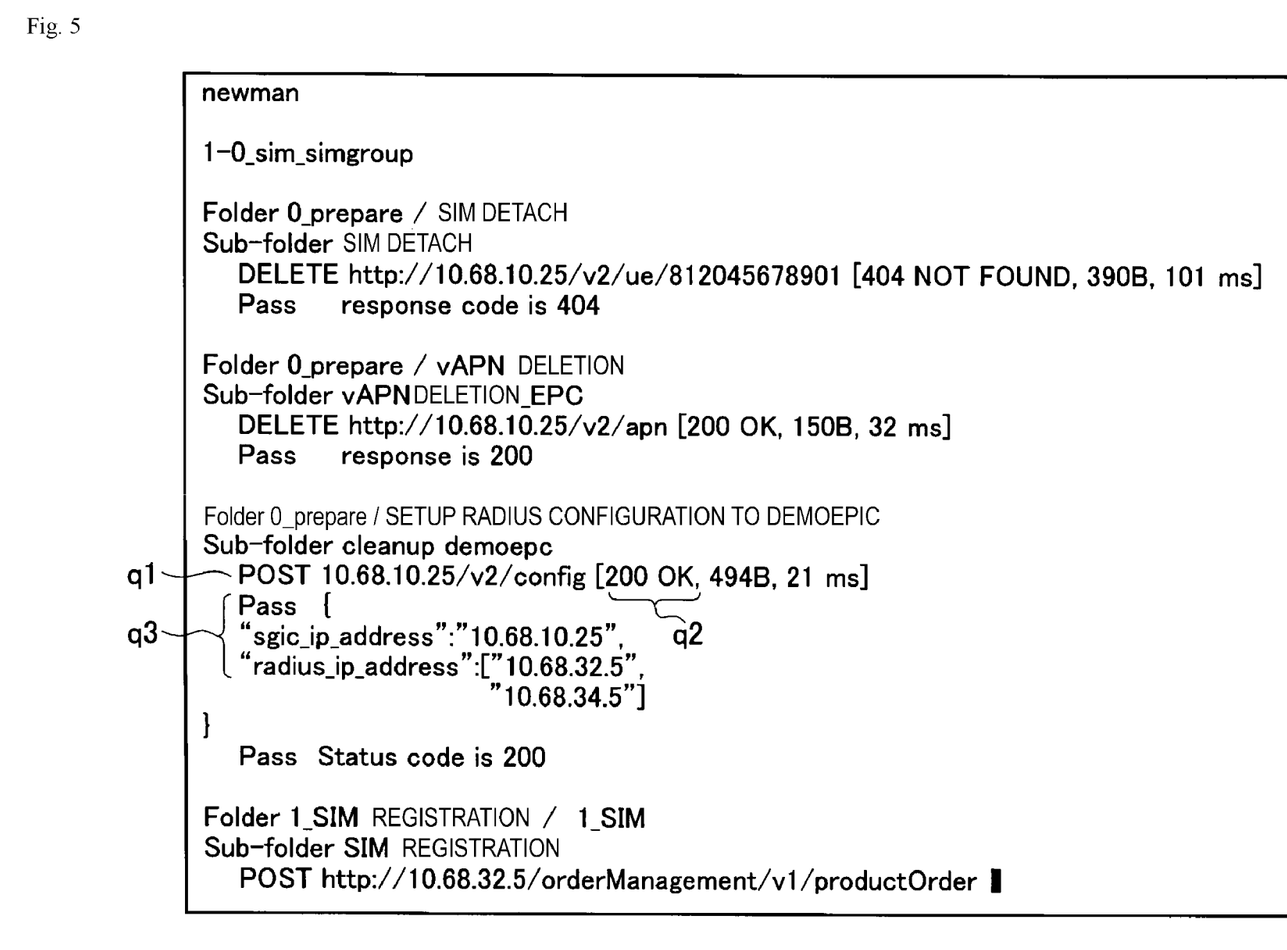
FIG. 5 is an explanatory diagram illustrating an API response in the case where an API is executed in the order designated by a newman script.

FIG. 5 illustrates an example of data representing execution of the API by the "newman" and its result, in which "POST 10.60.10.25" indicated by the reference symbol q1 indicates the test scenario, and [200 OK,] indicated by the reference symbol q2 and "[<]BEGINITALmsgic_ip_addres [<]BEGINITALm" . . . " indicated by the reference symbol q3 indicate the content of the API response. This example indicates that the execution of the control signal has succeeded. Details of the process at the control signal test scenario execution unit 34 are described below with reference to the sequence diagram illustrated in FIG. 7.

On the basis of the test scenario created by the test scenario creation unit 32, the data signal test scenario execution unit 41 illustrated in FIG. 2 causes the user terminal simulation apparatus 50 and the user server simulation apparatus 60 to execute the API of the data signal, and receives its response result. The data signal test scenario execution unit 41 can use "newman", which is an API test tool. The control signal test scenario execution unit 34 executes the API in the order designated by the "newman" script, and confirms the content of the API response. On the basis of the API response, the normality is determined depending on whether it is a response expected for the data signal for each query pattern, and thus test result information of the normality determination test is created. The process at the data signal test scenario execution unit 41 is described below with reference to the sequence diagram illustrated in FIG. 8.

The test result output unit 35 transmits the test result information created by the test scenario execution management unit 33, to the test result information acquiring unit 13 of the development staff terminal 10.

The user terminal simulation apparatus 50 is an apparatus simulating a user terminal such as a smartphone or an Internet of Things (IoT) device, for example. The user terminal simulation apparatus 50 is an apparatus that includes the API indicated in the following (A1), and implements a data signal test (for example, ping, curl) to the destination IP when the API is executed, for example. Specific examples of the API may include the following (A2).

(A1) POST/v1/ue/[user terminal identifier]/ping/[destination IP]
(A2) POST/v1/ue/812012345678/ping/192.168.0.1

The user server simulation apparatus 60 is an apparatus simulating a user server such as a web server, for example. The user server simulation apparatus 60 is a server that includes the API of the following (B1), and implements a data signal test (for example, ping, curl) to the destination IP when the API is executed, for example. Specific examples of the API may include the following (B2).

(B1) POST/v1/ue/[user terminal identifier]/ping/[destination IP]
(B2) POST/v1/ue/server01/ping/10.128.128.10

Description of Operation of Present Embodiment

Figure 6:
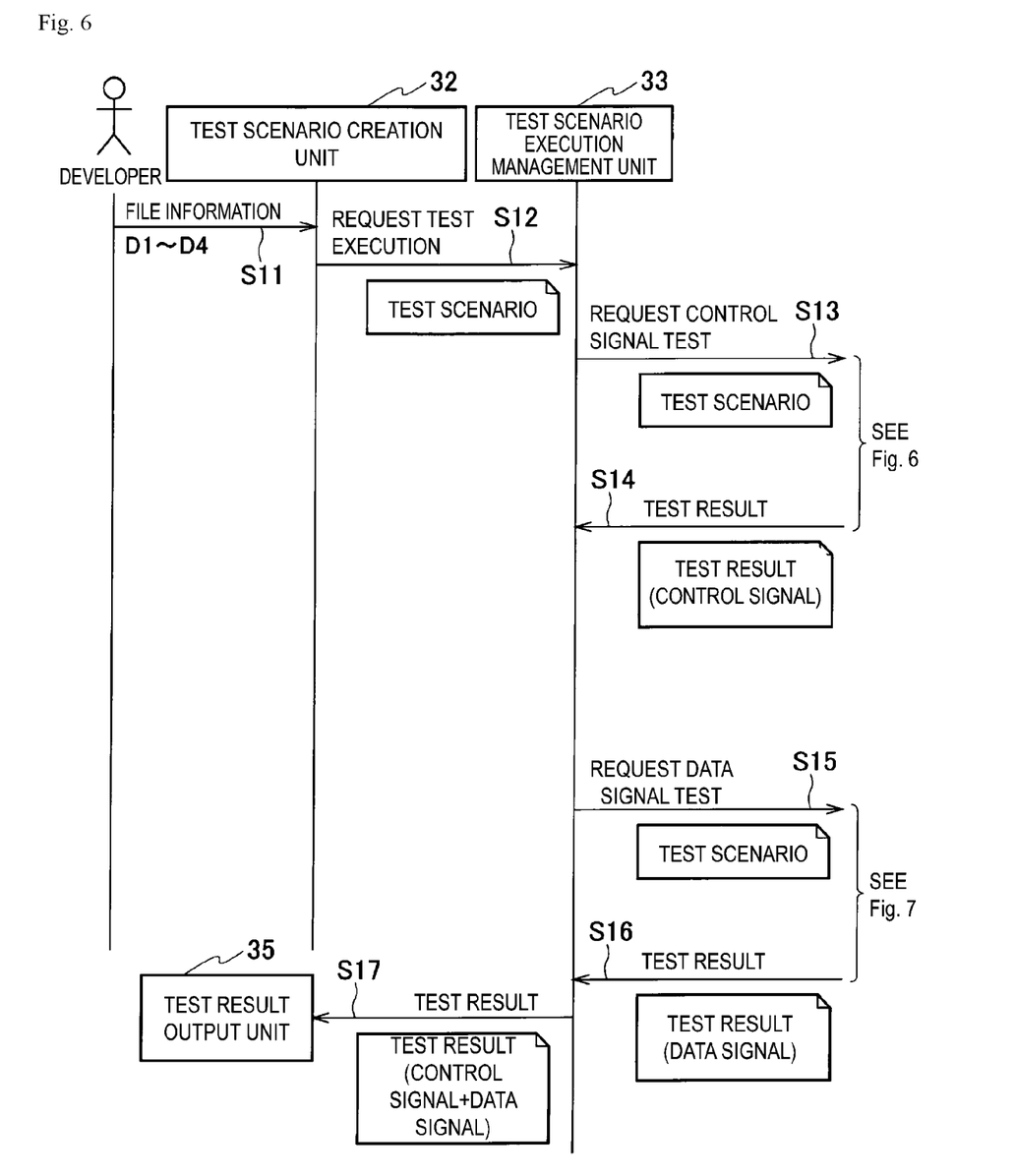
FIG. 6 is a first sectional diagram of a sequence diagram of a processing procedure of the API adapter test support system according to the embodiment of the present invention.
Figure 7:
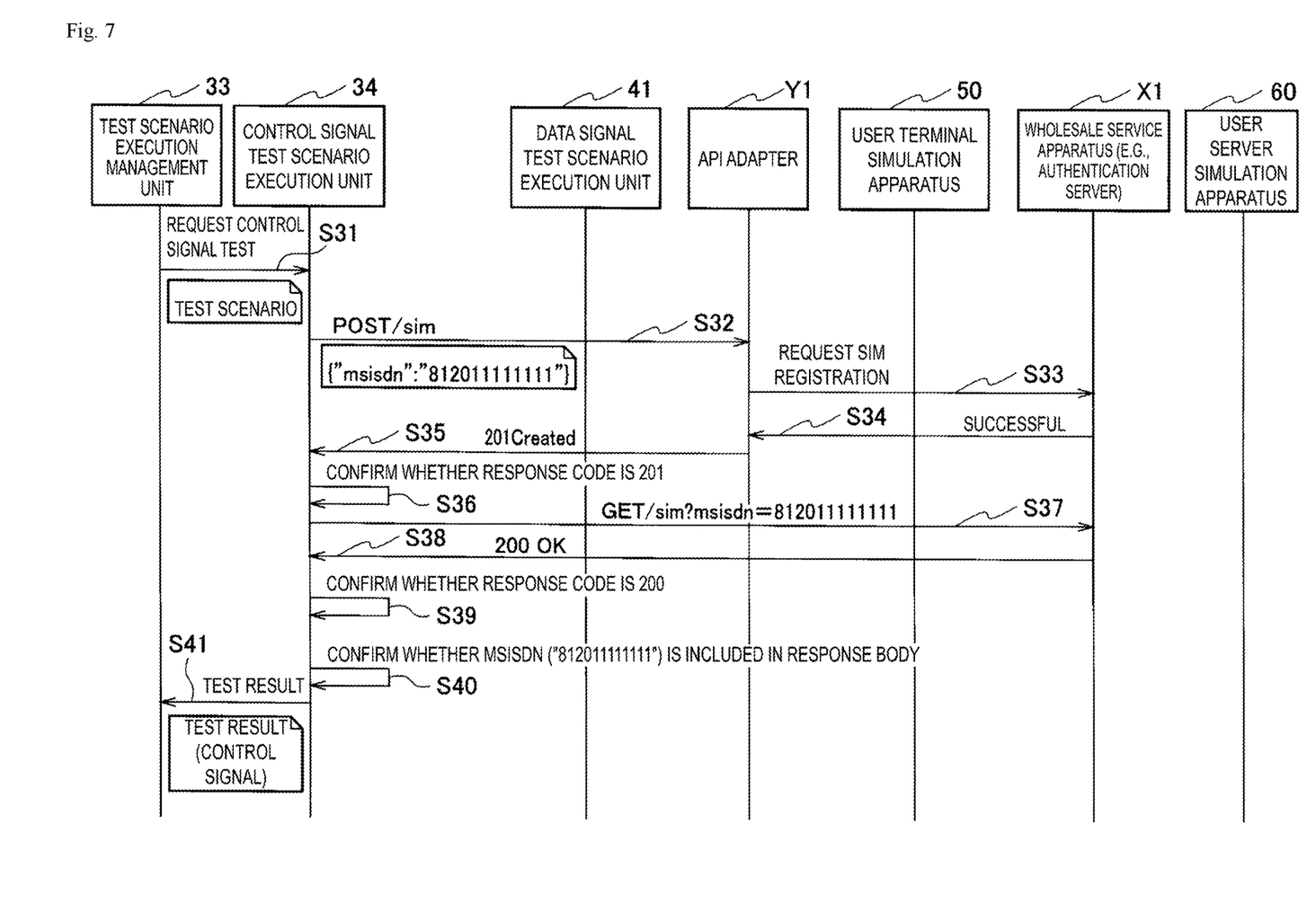
FIG. 7 is a second sectional diagram of the sequence diagram of a processing procedure of the API adapter test support system according to the embodiment of the present invention.
Figure 8:
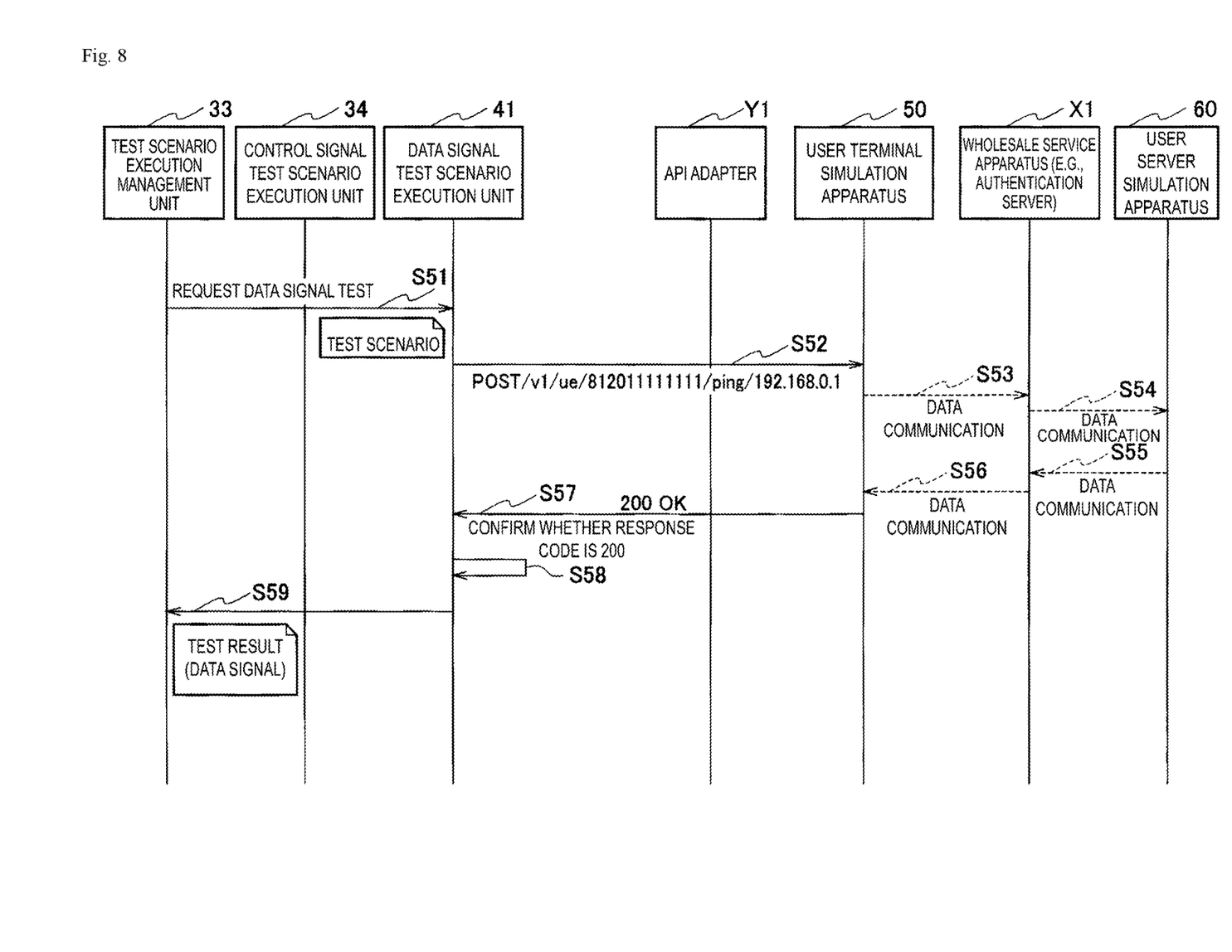
FIG. 8 is a third sectional diagram of the sequence diagram of a processing procedure of the API adapter test support system according to the embodiment of the present invention.
Figure 9:
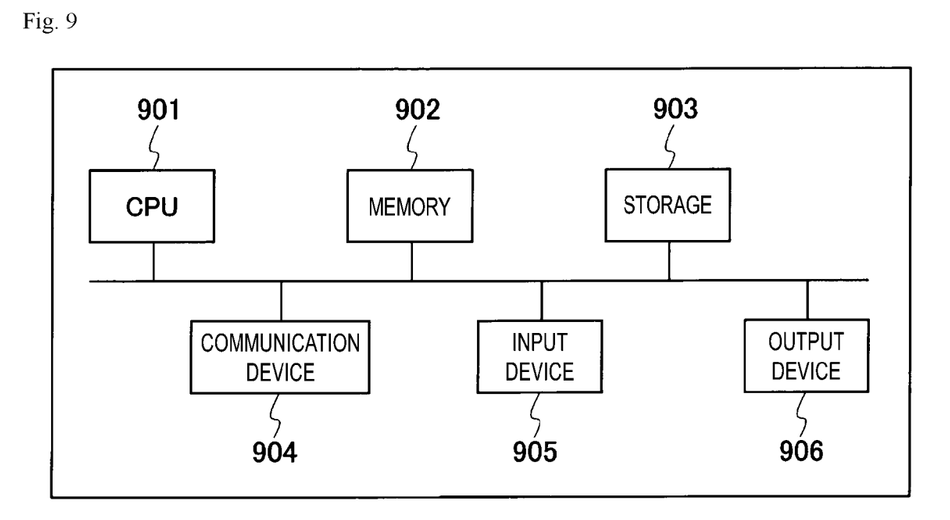
FIG. 9 is a block diagram illustrating a functional configuration of an API adapter test system according to the present invention.

Next, a processing procedure of the API adapter test support system 1 according to the present embodiment is described with reference to sequence diagrams illustrated in FIG. 6 to FIG. 8. FIG. 6 illustrates an overall processing procedure, FIG. 7 illustrates a processing procedure in execution of a test scenario of a control signal, and FIG. 8 illustrates a processing procedure in execution of a test scenario of a data signal.

First, with reference to FIG. 6, an overall processing procedure is described. At step S11 illustrated in FIG. 6, the development staff executes a process of transmitting file information, i.e., the NB-API specification data D1, the wholesale service API specification data D2, the test parameter D3, and the wholesale service data D4, from the development staff terminal 10 to the API adapter test support apparatus 2.

At step S12, the file reading unit 31 acquires the file information (D1 to D4) sent from the development staff terminal 10. Further, the test scenario creation unit 32 creates a test scenario on the basis of the acquired file information. As an example, the test scenario indicated by the reference symbol d10 in FIG. 4 is created.

Further, the test scenario creation unit 32 transmits the created test scenario to the test scenario execution management unit 33. Further, a test execution request of the test scenario is transmitted to the test scenario execution management unit 33.

At step S13, the test scenario execution management unit 33 transmits an execution request of the control signal test and the test scenario to the control signal test scenario execution unit 34.

At step S14, the test scenario execution management unit 33 receives a test result of the control signal test. Details of the control signal test are described below with reference to the sequence diagram illustrated in FIG. 7.

At step S15, the test scenario execution management unit 33 transmits an execution request of the data signal test and the test scenario to the data signal test scenario execution unit 41.

At step S16, the test scenario execution management unit 33 receives a test result of the data signal test. Details of the data signal test are described below with reference to the sequence diagram illustrated in FIG. 8.

At step S17, the test scenario execution management unit 33 transmits the test result of the control signal and the data signal to the test result output unit 35. The test result output unit 35 transmits the acquired test result to the development staff terminal 10 (see FIG. 1).

In the test result information acquiring unit 13 of the development staff terminal 10, the test result of the control signal and the data signal is displayed on a display device or the like, and thus the development staff can recognize the result of the API adapter test.

Next, a test scenario of a control signal is described with reference to the sequence diagram illustrated in FIG. 7. First, at step S31 (corresponding to S13 in FIG. 6) illustrated in FIG. 7, the test scenario execution management unit 33 transmits the execution request of the control signal test and the test scenario created at the test scenario creation unit 32 to the control signal test scenario execution unit 34.

At step S32, the control signal test scenario execution unit 34 transmits a control signal test scenario to the API adapter Y1. As an example, the scenario indicated in the following ($\alpha$1) is transmitted.

($\alpha$1) POST/sim-d'{"msisdn":"812011111111"}'

The scenario indicated in the ($\alpha$1) indicates the open order in the registration of the SIM information.

At step S33, the API adapter Y1 transmits a SIM registration request to the wholesale service apparatus X1.

At step S34, the API adapter Y1 acquires a response to the SIM registration request at the wholesale service apparatus X1. As an example, the response indicated in the following ($\alpha$2) is acquired.

($\alpha$2) pm.response.to.have.status (201)

At step S35, the API adapter Y1 transmits the response acquired from the wholesale service apparatus X1 to the control signal test scenario execution unit 34.

At step S36, the control signal test scenario execution unit 34 confirms whether the response code is "201".

At step S37, the control signal test scenario execution unit 34 transmits, to the wholesale service apparatus X1, a command for confirming whether the SIM information is registered in the authentication server. For example, the command indicated in the following ($\alpha$3) is transmitted.

($\alpha$3) GET/radius? msisdn=812011111111

At step S38, the control signal test scenario execution unit 34 receives a response code transmitted from the wholesale service apparatus X1. Further, at step S39, the control signal test scenario execution unit 34 confirms whether the response code is "200". For example, when the response indicated in the following ($\alpha$4) is obtained, it is determined to be OK.

($\alpha$4) a.response.to.have.status (200)

At step S40, the control signal test scenario execution unit 34 confirms whether there is a registered MSISDN number in the response body. For example, when the response indicated in the following ($\alpha$5) is obtained, it is determined to be OK.

($\alpha$5) pm.expect (data.msisdn).to.equal ("812011111111")

At step S41 (corresponding to S14 in FIG. 6), the control signal test scenario execution unit 34 transmits the test result to the test scenario execution management unit 33.

Next, a test scenario of a data signal is described with reference to the sequence diagram illustrated in FIG. 8. First, at step S51 (corresponding to S15 in FIG. 6) illustrated in FIG. 8, the test scenario execution management unit 33 transmits, to the data signal test scenario execution unit 41, an execution request of the data signal test and the test scenario created at the test scenario creation unit 32.

At step S52, the data signal test scenario execution unit 41 transmits a data signal test scenario to the user terminal simulation apparatus 50. As an example, the scenario indicated in the following ($\beta$1) is transmitted.

($\beta$1) POST/v1/ue/812011111111/ping/192.168.0.1

The scenario indicated in the 031) indicates that communication confirmation from "the user terminal simulation apparatus 50" to "the user server simulation apparatus 60" is implemented at the user terminal simulation apparatus 50.

At step S53, the user terminal simulation apparatus 50 transmits the data indicated in the ($\beta$1) to the wholesale service apparatus X1. Further, at step S54, the wholesale service apparatus X1 transmits the data indicated in the ($\beta$1) to the user server simulation apparatus 60.

At step S55, the wholesale service apparatus X1 receives the response transmitted from the user server simulation apparatus 60. Further, at step S56, the wholesale service apparatus X1 transmits the received response to the user terminal simulation apparatus 50.

Further, at step S57, the user terminal simulation apparatus 50 transmits the received response to the data signal test scenario execution unit 41.

At step S58, the data signal test scenario execution unit 41 confirms whether the response code is 200 (successful communication). For example, when the response indicated in the following ($\beta$2) is acquired, it is determined to be successful.

($\beta$2) pm.response.to.have.status (200)

At step S59 (corresponding to S16 in FIG. 6), the data signal test scenario execution unit 41 transmits the test result to the test scenario execution management unit 33.

Thereafter, as illustrated in step S17 in FIG. 6, the test scenario execution management unit 33 transmits the test result of the data signal and the control signal to the test result output unit 35, and further, the test result output unit 35 transmits the acquired test result to the test result information acquiring unit 13 of the development staff terminal 10 (see FIG. 1). As a result, the development staff can recognize the result of the API adapter test.

Description of Effect of Present Embodiment

As described above, according to the present embodiment, the following effect can be obtained.

(1)
A test scenario that ensures comprehensiveness is created using data of at least one of the file information transmitted from the development staff terminal 10, i.e., the NB-API specification data D1, the wholesale service API specification data D2, the test parameter D3, and the wholesale service data D4. Then, the test of the API adapter Y1 is executed using this test scenario. Thus, a test that reliably ensures comprehensiveness can be achieved.

(2)
Since the test scenario that ensures the comprehensiveness is created by employing the pairwise method, the test can be executed with a small test case amount. Thus, the determination test of the normality of the API adapter Y1 can be efficiently performed in a short time.

(3)
Since the determination test of the normality of the API adapter Y1 is performed by implementing both the control signal API test and the data signal API test, highly accurate test results can be obtained.

For example, in the case where only the control signal API test is implemented as the test of the normality of the API adapter Y1, it is determined to be normal when it is detected that an IP address is included even when a wrong IP address is included in the API response. However, by implementing both the control signal API test and the data signal API test, it is detected that an IP address is included in the API response, and further, if the IP address is not confirmed to be correct, it is not determined to be normal. Thus, the performance of the API adapter can be tested with higher accuracy.

In addition, while an example in which the data signal API test is executed for both the user terminal simulation apparatus 50 and the user server simulation apparatus 60 is described in the above-described embodiment, the effects of the present invention can be achieved by executing the data signal API test for at least one selected from the group consisting of the user terminal simulation apparatus 50 and the user server simulation apparatus 60.

The invention is not limited to the above embodiments, and various modification may be made within the scope of its gist.

As the above-described API adapter test support system 1 of the present embodiment, it is possible to use a general-purpose computer system including a central processing unit (CPU, processor) 901, a memory 902, a storage 903 (HDD: hard disk drive, SSD: solid state drive), a communication device 904, an input device 905, and an output device 906, for example. The memory 902 and the storage 903 are storage devices. In this computer system, when the CPU 901 executes a predetermined program loaded on the memory 902, each function of the API adapter test support system 1 is achieved.

Note that the API adapter test support system 1 may be implemented on a single computer, or a plurality of computers. In addition, the API adapter test support system 1 may also be a virtual machine implemented on a computer.

The program for the API adapter test support system 1 may be stored in a computer readable recording medium such as an HDD, an SSD, a universal serial bus (USB) memory, a compact disc (CD), a digital versatile disc (DVD), or may be distributed through a network.

REFERENCE SIGNS LIST

1 API adapter test support system
2 API adapter test support apparatus
10 Development staff terminal
11 Data storage unit
12 Data transmission unit
13 Test result information acquiring unit
20 API adapter creation apparatus
30 API adapter test support unit
31 File reading unit
32 Test scenario creation unit
33 Test scenario execution management unit
34 Control signal test scenario execution unit
35 Test result output unit
40 API adapter data signal test support unit
41 Data signal test scenario execution unit
50 User terminal simulation apparatus
60 User server simulation apparatus
D1 NB-API specification data
D2 Wholesale service API specification data
D3 Test parameter
D4 Wholesale service data
X1 Wholesale service apparatus
Y1 API adapter

The invention claimed is:

1. An application programming interface (API) adapter test support system for supporting a test for determining normality of an API adapter, the API adapter test support system comprising:
   an API adapter test support apparatus;
   a user terminal simulation apparatus; and
   a user server simulation apparatus, the user terminal simulation apparatus and the user server simulation apparatus being connected to a wholesale service apparatus that uses the API adapter,
   wherein
   the API adapter test support apparatus includes one or more processors configured to:
   create a test scenario that ensures comprehensiveness of a test case of an API adapter test by using at least one selected from the group consisting of an NB-API specification data, wholesale service API specification data, a test parameter, and wholesale service data transmitted from a user terminal;
   execute a control signal API test for the API adapter by using the test scenario; and
   execute a data signal API test for the user terminal simulation apparatus and the user server simulation apparatus by using the test scenario.

2. The API adapter test support system according to claim 1, wherein the API adapter test support apparatus is configured to create the test scenario that ensures the comprehensiveness by employing a pairwise method.

3. An API adapter test support apparatus for supporting a test for determining normality of an API adapter, the API adapter test support apparatus comprising one or more processors configured to:
   create a test scenario that ensures comprehensiveness of a test case of an API adapter test by using at least one selected from the group consisting of an NB-API specification data, wholesale service API specification data, a test parameter, and wholesale service data transmitted from a user terminal;

execute a control signal API test for the API adapter by using the test scenario; and execute a data signal API test for at least one selected from the group consisting of a user terminal simulation apparatus and a user server simulation apparatus connected to a wholesale service apparatus that uses the API adapter, by using the test scenario.

4. A non-transitory computer readable medium storing one or more instructions configured to cause a computer to function as the API adapter test support apparatus according to claim 3.

5. The API adapter test support apparatus according to claim 3, wherein the one or more processors are configured to:

create the test scenario that ensures the comprehensiveness by employing a pairwise method.

6. An API adapter test support method of supporting a test for determining normality of an API adapter, the method comprising:

creating a test scenario that ensures comprehensiveness of a test case of an API adapter test by using at least one selected from the group consisting of an NB-API specification data, wholesale service API specification data, a test parameter, and wholesale service data transmitted from a user terminal;

executing a control signal API test for the API adapter by using the test scenario; and executing a data signal API test for at least one selected from the group consisting of a user terminal simulation apparatus and a user server simulation apparatus connected to a wholesale service apparatus that uses the API adapter, by using the test scenario.

7. The API adapter test support method according to claim 6, comprising:

creating the test scenario that ensures the comprehensiveness by employing a pairwise method.

* * * * *